(12) United States Patent  
Czajkowski et al.

(10) Patent No.: US 9,135,087 B1  
(45) Date of Patent: Sep. 15, 2015

(54) WORKGROUP HANDLING IN PIPELINED CIRCUITS

(71) Applicant: ALTERA CORPORATION, San Jose, CA (US)

(72) Inventors: Tomasz Czajkowski, Toronto (CA); John Freeman, Toronto (CA); Peter Yiannacouras, Etobicoke (CA)

(73) Assignee: Altera Corporation, San Jose, CA (US)

( * ) Notice: Subject to any disclaimer, the term of this patent is extended or adjusted under 35 U.S.C. 154(b) by 270 days.

(21) Appl. No.: 13/727,813

(22) Filed: Dec. 27, 2012

(51) Int. Cl.  
*G06F 9/46* (2006.01)  
*G06F 9/54* (2006.01)

(52) U.S. Cl.  
CPC ........................................ *G06F 9/54* (2013.01)

(58) Field of Classification Search  
None  
See application file for complete search history.

(56) References Cited

U.S. PATENT DOCUMENTS

| | | | |
|---|---|---|---|
| 6,269,391 B1 * | 7/2001 | Gillespie | 718/100 |
| 7,287,255 B2 * | 10/2007 | Potter, Jr. | 718/102 |
| 7,406,694 B2 * | 7/2008 | Sen | 719/313 |
| 7,844,973 B1 * | 11/2010 | Dice | 718/108 |
| 2006/0136913 A1 * | 6/2006 | Sameske | 718/1 |
| 2009/0307704 A1 * | 12/2009 | Munshi et al. | 718/104 |
| 2010/0095071 A1 * | 4/2010 | Shirahige | 711/140 |
| 2011/0302586 A1 * | 12/2011 | Chung | 718/103 |
| 2014/0040893 A1 * | 2/2014 | Karve et al. | 718/1 |

OTHER PUBLICATIONS

"OpenCL—The open standard for parallel programming of heterogeneous systems", Khronos Group.

* cited by examiner

*Primary Examiner* — Lewis A Bullock, Jr.  
*Assistant Examiner* — Jacob Dascomb  
(74) *Attorney, Agent, or Firm* — Fletcher Yoder, P.C.

(57) ABSTRACT

Systems and methods for limiting resource usage of a kernel of an integrated circuit are provided. For example, in one embodiment a method for limiting a number of workgroups that may simultaneously access a kernel of an integrated circuit (IC) includes determining a threshold number of workgroups that may access the kernel simultaneously. A thread of execution is received. The thread of execution is allowed to access the kernel when the threshold number of workgroups would not be exceeded by the thread of execution accessing the kernel.

19 Claims, 4 Drawing Sheets

WORKGROUP HANDLING IN PIPELINED CIRCUITS

BACKGROUND

The present disclosure relates generally to integrated circuits (ICs). More particularly, the present disclosure relates to workgroup handling of kernels using a pipelined IC, such as a field programmable gate array (FPGA) or an application-specific integrated circuit (ASIC).

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Integrated circuits (ICs) take a variety of forms. For instance, field programmable gate arrays (FPGAs) are integrated circuits that are intended as relatively general-purpose devices. FPGAs may include logic that may be programmed (e.g., configured) after manufacturing to provide any desired functionality that the FPGA is designed to support. Thus, FPGAs contain programmable logic, or logic blocks, that may be configured to perform a variety of functions on the FPGAs, as programmed by a designer. Additionally, FPGAs may include input/output (I/O) logic, as well as high-speed communication circuitry. For instance, the high-speed communication circuitry may support various communication protocols and may include high-speed transceiver channels through which the FPGA may transmit serial data to and/or receive serial data from circuitry that is external to the FPGA.

In ICs such as FPGAs, the programmable logic is typically configured using low level programming languages such as VHDL or Verilog. Unfortunately, these low level programming language may provide a low level of abstraction and, thus, may provide a development bather for programmable logic designers. Higher level programming languages, such as Open CL have become useful for enabling more ease in programmable logic design. These higher level programming languages are used to generate code corresponding to the low level programming languages. These higher level programs have generally been limited to single-threaded processing on Single-Instruction-Multiple-Data (SIMD) machines where the system can offload thread state into main memory and proceed as needed through the execution of the program in a SIMD fashion. Unfortunately, this scheme does not provide for pipelined processing, especially when one or more threads of the program are designed to exchange data with other threads of the program.

As described herein, threads may refer to a lightweight process that may be run on an IC. Kernels may refer to a bridge between the threads and a processor of the IC. Further, workgroups refer to threads of execution that exchange data between one another.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments relate to systems and methods for implementing programming kernels in pipelined circuitry. More specifically, the described embodiments may provide enhanced handling of workgroups (e.g., threads of execution that exchange data between one another) in the pipelined circuitry. A workgroup limiter may keep track of specific workgroups entering a portion of a kernel. The workgroup limiter may identify the number of threads belonging to a specific workgroup that are currently live in the portion of the kernel and limit the number of workgroup threads that may enter the portion of the kernel, thus ensuring that a given resource is not overused (e.g., ensuring that an amount of onboard memory is not exceeded by a number of workgroups/workgroup threads allowed to enter the kernel).

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present invention alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed in further detail below, embodiments of the present disclosure relate generally to efficient use of resources in integrated circuits (ICs), such as field-programmable gate arrays (FPGAs). Certain threads of execution that enter a kernel exchange data with one another. Such threads constitute a workgroup. As new workgroups are introduced to the kernel, hardware resources may become overused or depleted. The techniques disclosed herein provide a mechanism to limit the number of workgroups/workgroup threads that may enter a kernel, such that the resources (e.g., memory) of the IC (e.g., FPGA) are not overused or depleted. A workgroup limiter on the IC (e.g., dedicated hardware or programmable logic) may monitor workgroups/workgroup threads that are live within a kernel. The workgroup limiter may act as a gatekeeper, limiting the number of workgroups/workgroup threads that may enter the kernel. Upon reaching a maximum number workgroups/workgroup threads that are allowable, the workgroup limiter may generate a stall signal, thus preventing further workgroups/workgroup threads from entering the kernel.

Figure 1:
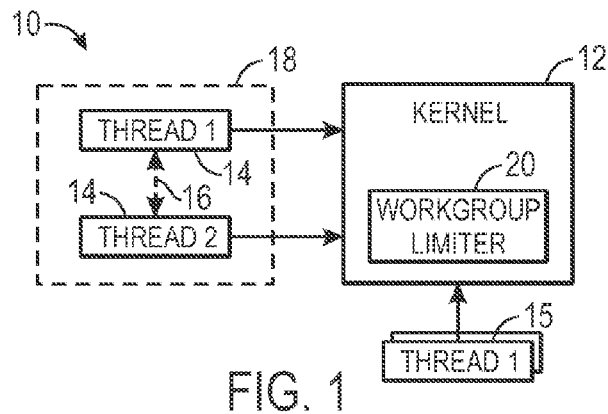
FIG. 1 illustrates an OpenCL implementation with a kernel and associated execution threads, in accordance with an embodiment.

With the foregoing in mind, FIG. 1 is a schematic diagram illustrating an OpenCL implementation 10 with a kernel 12 and associated execution threads 14, in accordance with an embodiment. As illustrated, during execution, the threads 14 may exchange certain data (as indicated by arrows 16). Because these threads 14 depend on data from one another during execution, the threads 14 are part of a workgroup 18. Additional, non-workgroup threads (e.g., threads 15) may enter the kernel 12 as well. These independent threads 15 may access the kernel 12 without sharing information with other threads (e.g., threads 14) in the implementation 10. As threads (e.g., threads 14 and 15) enter the kernel 12, the hardware resources needed to execute the threads 14 and 15 may become overused and/or depleted. Thus, one or more workgroup limiters 20 may be incorporated into the kernel 20 to limit the number of workgroups 18, workgroup threads 14, and/or independent threads 15 that may enter the kernel. By limiting the threads 14 and 15 and/or the workgroups 18 that may enter the kernel 12, the workgroup limiter 20 may conserve IC resources (e.g., memory and/or functional block area) which may ultimately provide increased reliability of the overall implementation 10. The limit on the number of workgroups 18 that the workgroup limiter 20 permits may vary by application. For example, the workgroup limiter 20 might limit the number of workgroups 18 to 2, 3, 4, or 8 workgroups for different implementations. The number of workgroup limitations may be scaled dynamically within the workgroup limiter 20 such that there may be added flexibility in implementation.

Figure 2:
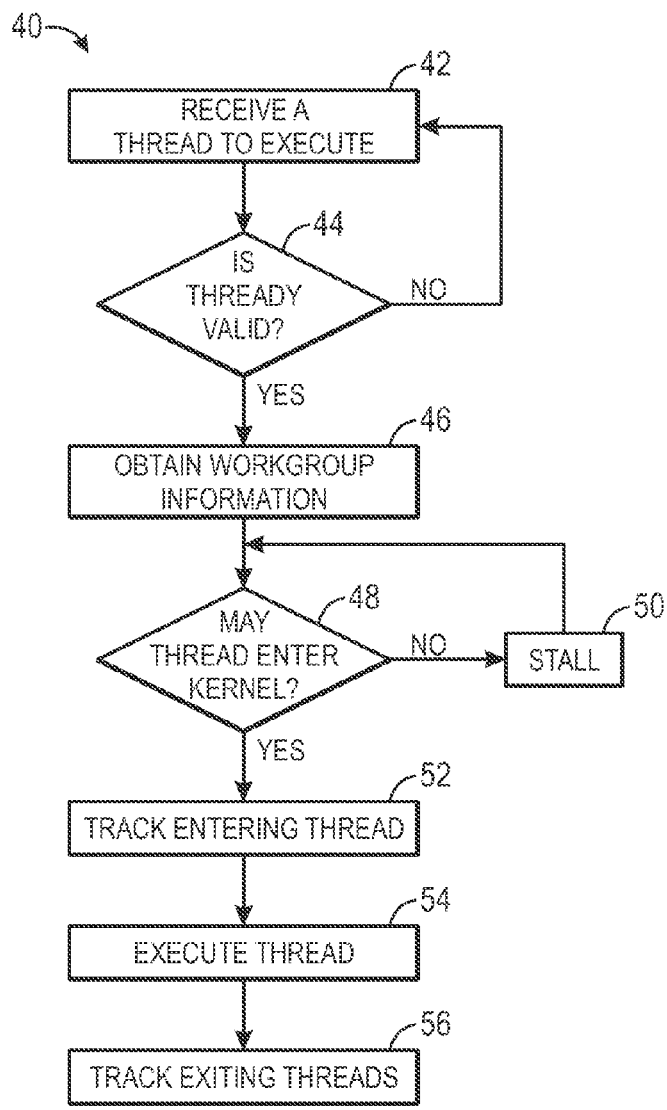
FIG. 2 illustrates a process for limiting the number of workgroups and/or workgroup threads that may access the kernel of FIG. 1, in accordance with an embodiment.

FIG. 2 illustrates a process 40 for limiting the number of workgroups and/or workgroup threads that may access the kernel. The workgroup limiter may receive a thread to execute (block 42). Sometimes the thread data provided by an integrated circuit (IC) will not be valid because the IC may continually provide data regardless of whether or not the data is of use. Because integrated circuits (ICs) may send invalid data, the workgroup limiter may need to determine whether or not the thread data is valid (block 44). If the thread data is not valid, the process 40 returns to block 42, waiting to receive a new thread of execution. However, if the thread data is valid, the workgroup limiter may obtain workgroup information regarding the thread. For example, the workgroup limiter may determine a workgroup identifier associated with the thread data, a group identifier, a number of work items in the kernel for the associated workgroup identifier, a size of the workgroup, and/or debugging information (e.g., execution timings, etc.) (block 46). This information may be provided to the workgroup limiter by upstream components of the IC that provide threads to be executed. Based upon the workgroup information associated with the thread data, the workgroup limiter may determine whether the thread may enter the kernel or not (block 48). For example, the workgroup information may describe a static or dynamic workgroup threshold and/or workgroup thread threshold that defines a number of workgroups and/or workgroup threads that may access the kernel at once. When the allotted number of workgroups and/or workgroup threads is greater than the number of workgroups and/or workgroup threads that have entered the kernel, additional threads may enter the kernel. However, when the number of workgroups and/or workgroup threads equals or exceeds the allotted number of workgroups and/or workgroup threads defined by the workgroup and workgroup thread thresholds, no additional workgroups and/or workgroup threads may access the kernel. When the thread data may not access the kernel, the workgroup limiter may stall the execution (block 50) of the thread until the workgroup limiter determines that the thread data may access the kernel (at block 48). As will be described in more detail with regards to FIG. 5, when the thread data is permitted to access the kernel, the thread information is tracked (block 52). Thus, the workgroup limiter stays apprised of the number of workgroups and/or workgroup threads that are accessing the thread. The thread is then executed (block 54). Further, upon completion of the executed thread, the workgroup limiter may track the threads that are exiting the kernel (block 56), such that the number of workgroups and/or workgroup threads accessing the kernel is updated according to workgroups and/or workgroup threads no longer accessing the kernel.

Figure 3:
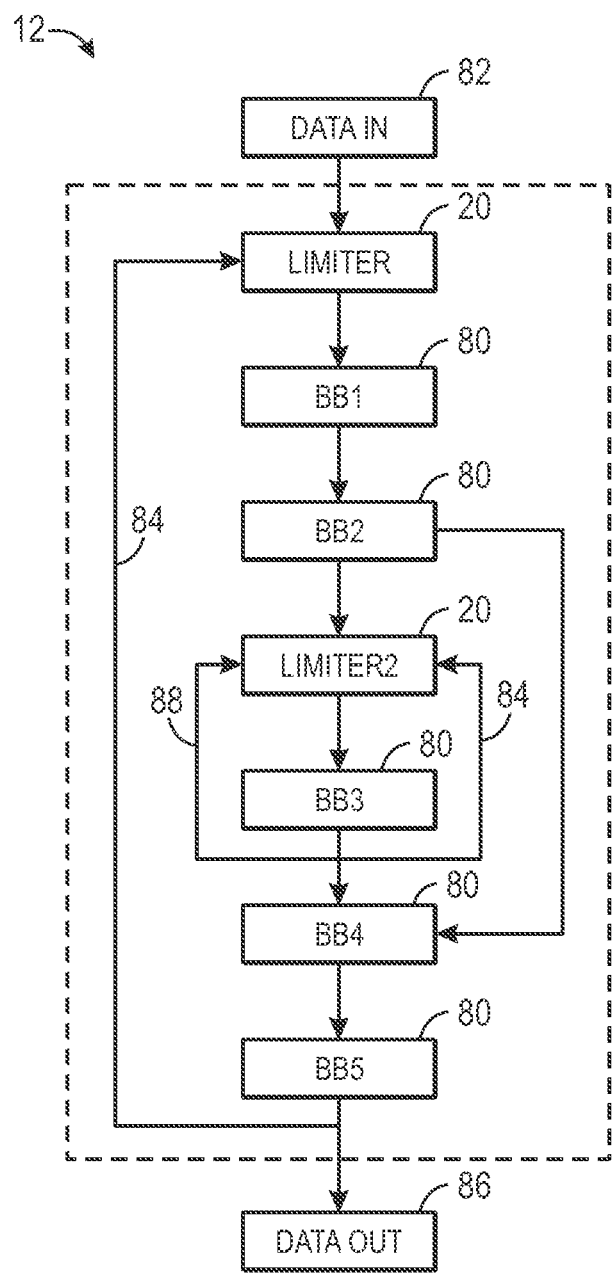
FIG. 3 is a schematic diagram of a kernel with an associated workgroup limiter, in accordance with an embodiment.

FIG. 3 is a schematic diagram of an example of a kernel 12 with a workgroup limiter 20. The kernel 12 includes basic blocks 80 (e.g., BB1-BB5). The basic blocks 80 represent pipelined logic that process incoming data (e.g. data coming from the data in 82). As previously discussed, threads that enter the kernel 12 may use the onboard resources (e.g., memory) of the IC. The workgroup limiter may limit the number of workgroup threads 14 that enter the subsequent basic blocks 80. As data enters through the data in 82, the workgroup limiter 20 determines whether the workgroup threads 14 or independent threads 15 may enter the subsequent basic blocks 80. As illustrated in this embodiment, the workgroup limiter 20 may be placed at the first piece of logic of the kernel 12, thus enabling all of the subsequent logic to be limited based upon the workgroup limiter 20. A feedback signal 84 may be place in a position along the kernel 12 pathway where the workgroup limiter 20 should quit monitoring. For example, in the embodiment of FIG. 3, the feedback signal 84 is located after each of the basic blocks 80 (BB1-BB5) have executed. In the provided embodiment, the feedback signal 84 is place near the data out 86. Accordingly, because the workgroup limiter 20 is place before any basic blocks 80 and the feedback signal 84 is placed after each of the basic blocks 80, the workgroup limiter 82 limitations will limit each of the basic blocks 80 in the kernel 12.

In some embodiments, it may be beneficial to provide different limitations to different portions of kernel 12. In some embodiments, additional and/or alternative workgroup limiters 20 may be incorporated to separate portions of the kernel 12. For example, some basic blocks 80 may likely be accessed more frequently than others, and thus may be more likely to consume resources more quickly than other basic blocks 80. Accordingly, it may be beneficial to limit these basic blocks 80 (e.g., BB3) with additional limitations. For example, in the embodiment of FIG. 3, basic block 80 BB3 includes a loop 88 that may potentially result in basic block 3 being accessed on a more frequent basis. An additional workgroup limiter (e.g., Limiter 2) along with a feedback signal 84 may encompass basic block 80 BB3. The limitations associated with Limiter 2 will now provide additional workgroup and/or thread limitations for BB3.

Figure 4:
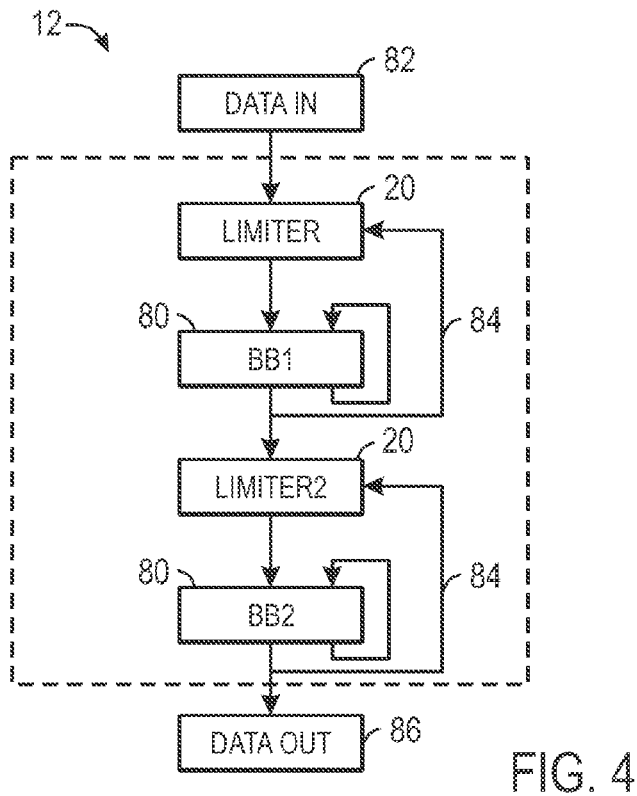
FIG. 4 is a schematic diagram of a kernel with a plurality of workgroup limiters, in accordance with an embodiment.

In some embodiments, portions of the kernel 12 may be limited by separate workgroup limiters 20. This may result in significant resource savings for the implementation. For example, FIG. 4 illustrates a kernel 12 with two workgroup limiters 20. Limiter 1 limits the number workgroups and/or threads that may enter basic block 80 BB1. Limiter 2 limits the number of workgroups and/or threads that may enter basic block 80 BB2. Assuming that basic blocks 80 BB1 and BB2 use different amounts of memory, the total amount of memory needed to implement the solution can be reduced. For example, if basic block 80 BB1 uses M bytes of memory and basic block 80 BB2 uses N bytes of memory, then the total about of memory needed by the solution is M+N. However, if only one workgroup limiter 20 were responsible for limiting both BB1 and BB2, the amount of memory needed to implement the solution would increase because the workgroup limiter 20 would need to account for both basic blocks 20. Thus, the maximum amount of memory used between the two basic blocks BB1 and BB2 could be doubled. Accordingly, the increased memory would be:
Memory Used: 2*max(M,N).

Figure 5:
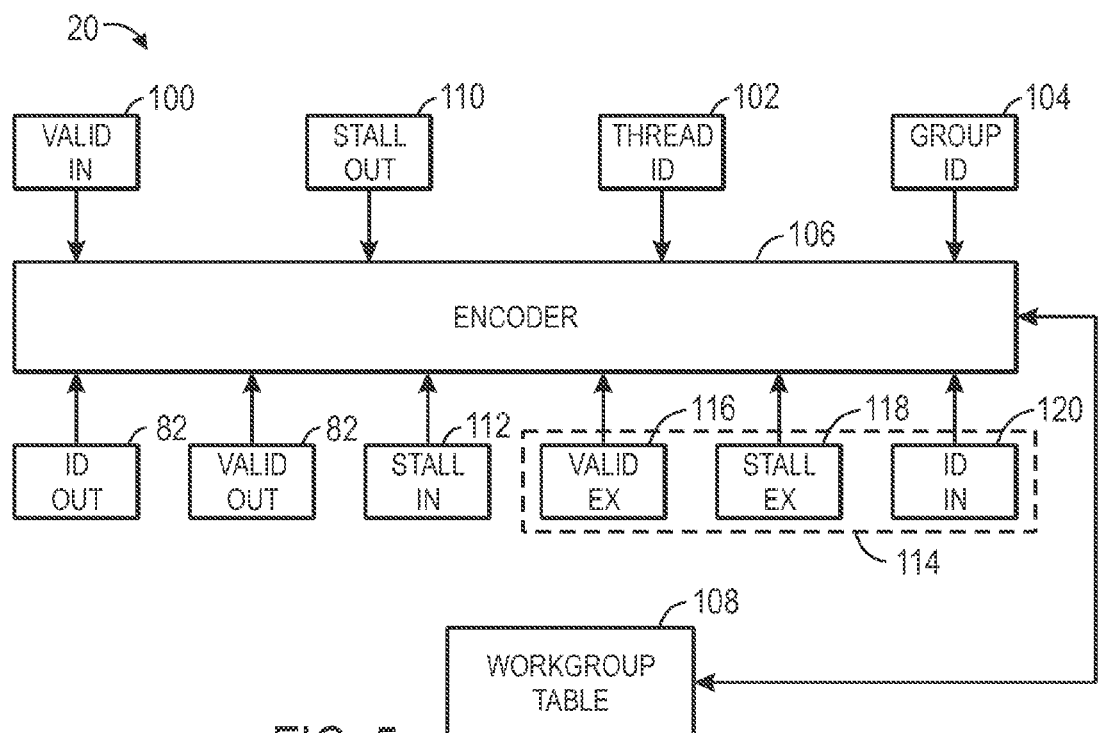
FIG. 5 is a schematic diagram of a workgroup limiter, in accordance with an embodiment.

Having now looked at certain techniques for workgroup handling, a more detailed discussion of the workgroup limiters 20 will be provided. FIG. 5 illustrates an embodiment of a workgroup limiter 20. The workgroup limiter 20 may include a valid input 100 that accepts a validity signal. The validity signal may represent whether or not data flowing into the workgroup limiter 20 is valid. Under certain circumstances, circuitry may emit data to the workgroup limiters 20 despite no valid operation being present. In such situations, the emitted data may be signal noise that should be ignored by the workgroup limiter 20. Accordingly, as data enters the workgroup limiter 20, the validity signal provided to the valid in 100 may provide the workgroup limiter 20 the necessary data to distinguish noise from valid operation data.

The workgroup limiter 20 may also receive as inputs identification information relating to the operation data that is received at the workgroup limiter 20 from upstream components that provide threads to be executed. For example, the workgroup limiter may include a thread ID input 102 and/or a group ID input 104. The thread ID input 102 may take in a signal that identifies the specific thread of execution that is being provided to the workgroup limiter 20. The group ID input 104 may take in a signal that identifies a specific workgroup associated with the thread that is being passed to the workgroup limiter 20.

As new threads attempt to access a kernel through the workgroup limiter 20, the encoder 106 analyzes the thread ID input 102 signal and the group ID input 104 signal. When a new group ID (e.g., a new workgroup) is provided to the encoder 106 through the group ID input 104, the encoder 106 may attempt to insert an entry into a workgroup table 108. The workgroup table 108 may include rows indexed by a workgroup (e.g., a group ID provided by the group ID input 104). In OpenCL, workgroup identifiers may include 3 separate values. Accordingly, in some embodiments, the group ID index may be 3 dimensional. Each workgroup-indexed entry in the workgroup table 108 may include the group id, a number of work items (e.g., threads) of a particular workgroup that are currently in the kernel, and/or a size of the workgroup. Further, the workgroup table 108 may store other data that may be useful for debugging or other purposes. For example, in certain embodiments, the workgroup table 108 may store timing information such as the amount of time specific threads and/or workgroups have been in the kernel.

In certain embodiments, to limit the number of workgroups that may enter a kernel, the workgroup table 108 may include a defined number of useable slots for such entries from the encoder 106. The number of slots allotted in the workgroup table 108 may correspond with the number of workgroups that may enter a kernel at a time (e.g., the number of workgroups that the workgroup limiter 20 should allow to access the kernel). When all of the slots in the workgroup table 108 are full, the encoder 106 may determine that no additional workgroups should be allowed to enter the kernel. For example, a workgroup table 108 may include 2 slots for workgroup entry data when the workgroup limiter 20 is set to limit a number of workgroups that enter a kernel to 2. When a thread of a first workgroup attempts to enter the thread, there are two empty slots and thus the encoder 106 may insert an entry into one of the two slots, signifying that a workgroup is currently accessing the kernel. When a second thread of a second workgroup attempts to access the kernel, the encoder 106 may determine that the thread is a part of a different workgroup than those already in the kernel, and accordingly may add a second entry in to the second slot of the workgroup table 108. At this point, no additional workgroups may access the kernel until one of the workgroups exits the kernel, and thus frees up a slot in the workgroup table 108. When additional workgroups try to access a kernel and the workgroup table 108 is full, the encoder 106 may provide a stall signal through the stall output 110. The stall signal may indicate that no additional workgroups may enter the kernel and may prevent threads from entering the kernel by providing the stall signal to upstream components. Additionally or alternatively, a stall in input 112 may be used by the encoder to trigger a stall based upon a signal from an upstream component that is requesting the stall.

As workgroups exit the kernel, the encoder 106 may update the workgroup table 108 to remove workgroup entries. The stall signal may then be removed and additional workgroups may enter the kernel. Feedback inputs 114 may be incorporated into the workgroup limiter 20 to enable the encoder 106 to interact with downstream workgroup limiters 20. For example, the feedback inputs 114 may include a valid exit input 116, a stall exit input 118, and an ID input 120. The valid exit input 116 may be used to determine whether a valid signal has exited kernel. The ID input 120 may be used to provide a thread of ID of a thread that has exited the kernel. The stall exit input 118 may be used by the encoder 106 to determine whether the encoder should stall upstream threads from entering the kernel based upon downstream stalls. For example, as discussed above, with regards to FIG. 4, multiple workgroup limiters 20 may be used in conjunction with one another. If a downstream workgroup limiter 20 (e.g., BB2 of FIG. 4) initiates a stall through providing a stall output 110 signal, the signal may be provided to the upstream workgroup limiter (e.g., BB1 of FIG. 4), causing BB1 to initiate a stall regardless of whether or not there are workgroup slots available in the workgroup table 108 of BB1.

Figure 6:
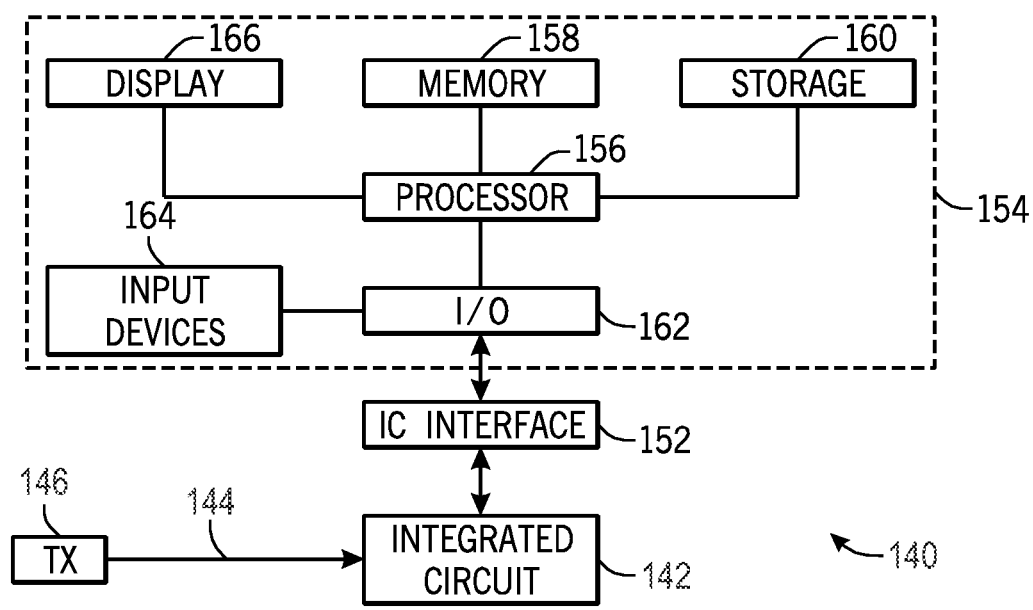
FIG. 6 is a system 140 that enables a programmable logic designer to implement a workgroup limiter, such as the workgroup limiter of FIG. 5 in programmable logic of the IC, in accordance with an embodiment.

FIG. 6 illustrates a system 140 that enables a programmable logic designer to implement a workgroup limiter, such as the workgroup limiter 20 of FIG. 5 in programmable logic of the IC. As illustrated in FIG. 6, the system 140 includes the integrated circuit (IC) 142, which receive the receiver (RX) input signal 144 from the transmitter (TX) 146. An IC interface 152 may enable communication between the IC 142 and a data processing system 154. Such an IC interface 152 may include, for example, programmable logic device (PLD) logic within field programmable gate array (FPGA) circuitry. The IC interface 152 may operate in conjunction with FPGA software, such as Quartus® by Altera Corporation, which may enable programming of intellectual property (IP) into the IC 142. Additionally or alternatively, the data may be sent out via normal FPGA I/O pins of the IC 142. The receiving party may include, for example, the data processing system 154 or test equipment such as an oscilloscope. Such data processing system 154 or test equipment may generally process and construct an eye diagram in software or hardware using the techniques described below.

The data processing system 154 may include, among other things, a processor 156 coupled to memory 158, a storage device 160, input/output (I/O) resources 162 (which may communicably couple the processor 156 to various input devices 164), and a display 166. The memory 158 and/or storage 160 may store one or more algorithms for generating the workgroup limiters, such as the workgroup limiter 20 of FIG. 5, based on an analysis of the programmable logic design, a user interaction via the IC interface 152, or both. The data processing system 154 may use these algorithms to construct the workgroup limiter and provide associated feedback and/or prompts for display on the display 166.

In some embodiments, while observing the feedback and/or prompts on the display 166, a designer or field engineer may adjust certain features of the workgroup limiters, such as manually applying a threshold number of workgroups that may access a kernel. Further, the display 166 may be used to provide operational parameters obtained by the data processing system from the workgroup limiter. For example, during operation of the IC 142, the workgroup limiter may track and store diagnostic information, such as: kernel access time of threads, a number of workgroups accessing the kernel, a number of workgroups accessing the kernel, thread identities of threads accessing the kernel, a number of threads of a particular workgroup that are accessing the kernel, the size of a workgroup accessing the kernel, etc.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

What is claimed is:

1. A method for limiting a number of workgroups that may simultaneously access a kernel of an integrated circuit (IC), the method comprising:
   tracking a plurality of threads that currently access the kernel and workgroup information associated with the plurality of threads;
   determining a threshold number of workgroups that may access the kernel simultaneously, wherein the threshold is based on an allotment of additional workgroups that are expected not to cause overuse, depletion or both of hardware resources of the integrated circuit;
   receiving a first thread of execution and workgroup information associated with the first thread;
   determining, based on the workgroup information associated with the first thread and workgroup information associated with the plurality of threads that currently access the kernel, if allowing the first thread access to the kernel will result in an additional workgroup accessing the kernel;
   allowing the first thread to access the kernel when it is determined the first thread would not result in an additional workgroup accessing the kernel;
   allowing the first thread to access the kernel when it is determined the first thread would not exceed the threshold; and
   disallowing the first thread to access the kernel when doing so would exceed the threshold number of workgroups.

2. The method of claim 1, comprising:
   determining whether or not the first thread of execution is valid; and
   allowing the first thread of execution to access the kernel only when the thread of execution is valid.

3. The method of claim 1, comprising:
   wherein the threshold number of workgroups is determined by:
      accessing a workgroup table;
      determining the number of empty rows in the workgroup; and
      setting the threshold to the number of empty rows in the workgroup table.

4. The method of claim 3, comprising:
   tracking the threads that access the kernel and workgroup information associated with the threads that access the kernel;
   receiving a second thread of execution and associated workgroup information;
   determining whether an additional workgroup may access the kernel by comparing the threshold with the workgroup information associated with the threads that access the kernel;
   determining whether an additional workgroup would be accessing the kernel if the second thread was allowed to access the kernel by comparing the workgroup information associated with the second thread of execution with the workgroup information associated with the threads that access the kernel; and
   allowing the second thread of execution to access the kernel when an additional workgroup may access the kernel, when the second thread of execution does not result in an additional workgroup accessing the kernel, or both.

5. The method of claim 1, comprising:
   receiving workgroup information associated with the first thread of execution;
   accessing a workgroup table upon receiving the first thread of execution;
   determining whether the workgroup information corresponds to workgroup information already stored in the workgroup table;
   when the workgroup information does not correspond to workgroup information already stored in the workgroup table and there is an empty row in the workgroup table, adding the workgroup information to the empty slot in the workgroup table; and
   when the workgroup information does not correspond to workgroup information already stored in the workgroup table and there is not an empty row in the workgroup table disallowing the first thread of execution from accessing the kernel.

6. The method of claim 5, comprising disallowing the first thread of execution by providing a stall signal to an upstream component providing the first thread of execution.

7. The method of claim 5, comprising:
   determining when the first thread of execution has finished accessing the kernel; and removing the workgroup information associated to the first thread of execution from the workgroup table when the first thread of execution has finished accessing the kernel.

8. An integrated circuit (IC), comprising:
programmable logic configured to store a programmable design, wherein the programmable design is configured to implement customized functions on the IC device; and
a workgroup limiter configured to limit a number of workgroups accessing a kernel of the programmable design, the workgroup limiter configured to:
  track a plurality of threads that currently access the kernel and workgroup information associated with the plurality of threads;
  determine a threshold number of workgroups that may access the kernel simultaneously, wherein the threshold is based on an allotment of additional workgroups that are expected not to cause overuse, depletion or both of hardware resources of the integrated circuit;
  receive a first thread of execution and workgroup information associated with the first thread;
  determine, based on the workgroup information associated with the first thread and workgroup information associated with the plurality of threads that currently access the kernel, if allowing the first thread access to the kernel will result in an additional workgroup accessing the kernel;
  allow the first thread to access the kernel when it is determined the first thread would not result in an additional workgroup accessing the kernel;
  allow the first thread to access the kernel when it is determined the first thread would not exceed the threshold; and
  disallow the first thread to access the kernel when doing so would exceed the threshold number of workgroups.

9. The integrated circuit of claim 8, wherein the workgroup limiter comprises dedicated circuitry apart from the programmable logic.

10. The integrated circuit of claim 8, wherein the workgroup limiter comprises:
thread inputs configured to provide thread information relating to threads attempting to access the kernel of the programmable design;
a workgroup table configured to store data relating to threads that are accessing the kernel; and
a stall output configured to provide a stall signal to upstream components indicating that the thread is not permitted to access the kernel.

11. The integrated circuit of claim 8, wherein the workgroup limiter comprises an encoder configured to:
obtain a workgroup identifier representative of a workgroup associated with threads attempting to access the kernel;
obtain a thread identifier representative of the threads attempting to access the kernel;
determine whether the workgroup identifier is in a workgroup table;
determine whether there is an empty row in the workgroup table;
insert the workgroup identifier and the thread identifier in the workgroup table if the workgroup identifier is not in the workgroup table and there is an empty row in the workgroup table; and
provide the stall signal when the workgroup identifier is not in the workgroup table and there is not an empty row in the workgroup table.

12. The integrated circuit of claim 11, wherein the encoder is configured to store the thread identifier in a row containing the workgroup identifier when the workgroup identifier is in the workgroup table.

13. The integrated circuit of claim 11, wherein the workgroup limiter comprises thread outputs configured to provide permitted thread data comprising the thread identifier and the workgroup identifier to the kernel after the workgroup identifier and the thread identifier is inserted into the workgroup table or when the workgroup identifier is in the workgroup table.

14. The integrated circuit of claim 11, wherein the encoder is configured to remove the workgroup identifier from the workgroup table when all threads associated with the workgroup identifier are no longer accessing the kernel.

15. The integrated circuit of claim 11, wherein the workgroup table is configured to store a size of workgroups accessing the kernel, threads associated with a workgroup that are accessing the kernel, an amount of time that each workgroup has been accessing the kernel, an amount of time that each thread has been accessing the kernel, or a combination thereof.

16. The integrated circuit of claim 11, wherein the workgroup limiter comprises a stall input configured to receive a stall signal from downstream components, wherein the encoder is configured to provide a stall signal to upstream components when the stall signal is received from the stall input.

17. A tangible, non-transitory, computer-readable medium, comprising instructions to:
provide a programmable logic interface for an integrated circuit, the programmable logic interface being configured to enable a designer to implement an integrated circuit design in programmable logic of the integrated circuit; and
generate a workgroup limiter in the programmable logic, the workgroup limiter configured to:
  track a plurality of threads that currently access a kernel and workgroup information associated with the plurality of threads;
  determine a threshold number of workgroups that may access the kernel simultaneously, wherein the threshold is based on an allotment of additional workgroups that are expected not to cause overuse, depletion or both of hardware resources of the integrated circuit;
  receive a first thread of execution and workgroup information associated with the first thread;
  determine, based on the workgroup information associated with the first thread and workgroup information associated with the plurality of threads that currently access the kernel, if allowing the first thread access to the kernel will result in an additional workgroup accessing the kernel;
  allow the first thread to access the kernel when it is determined the first thread would not result in an additional workgroup accessing the kernel;
  allow the first thread to access the kernel when it is determined the first thread would not exceed the threshold; and
  disallow the first thread to access the kernel when doing so would exceed the threshold number of workgroups.

18. The tangible, non-transitory, computer-readable medium of claim 17, comprising instructions to analyze the workgroup limiter to obtain operational parameters of the integrated circuit design, the operational parameters comprising:

an access time of threads, workgroups, or both accessing the kernel;
    a number of workgroups accessing the kernel;
    a number of threads accessing the kernel;
    thread identities of threads accessing the kernel;
    a number of threads of a particular workgroup that are accessing the kernel;
    the size of a workgroup accessing the kernel; or
    a combination thereof.

19. The tangible, non-transitory, computer-readable medium of claim 17, comprising instructions to dynamically adjust the threshold number of workgroups that may access the kernel of the integrated circuit design based upon an analysis of the implementation, a user interaction, or both.

\* \* \* \* \*